US006930854B2

(12) United States Patent
Taki et al.

(10) Patent No.: US 6,930,854 B2
(45) Date of Patent: Aug. 16, 2005

(54) TAPE LIBRARY

(75) Inventors: Yoshitsugu Taki, Kanagawa (JP); Masahiro Kodama, Kanagawa (JP); Ryuji Takatsuka, Tokyo (JP); Toshiya Kurokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 465 days.

(21) Appl. No.: 09/992,935

(22) Filed: Nov. 5, 2001

(65) Prior Publication Data

US 2002/0101685 A1 Aug. 1, 2002

(30) Foreign Application Priority Data

Nov. 10, 2000 (JP) ..................................... P2000-343150
Jun. 26, 2001 (JP) ..................................... P2001-193774

(51) Int. Cl.[7] .............................................. G11B 15/68
(52) U.S. Cl. ....................................................... 360/92
(58) Field of Search ............................. 360/92, 98.04; 369/30.72, 30.39, 30.45

(56) References Cited

U.S. PATENT DOCUMENTS

| | | | | |
|---|---|---|---|---|
| 5,255,251 A | * | 10/1993 | Fitzgerald et al. | ....... 369/30.45 |
| 5,274,516 A | * | 12/1993 | Kakuta et al. | ................. 360/92 |
| 5,285,333 A | * | 2/1994 | Barr et al. | ..................... 360/92 |
| 5,640,288 A | * | 6/1997 | Horie | ....................... 360/98.04 |
| 5,870,245 A | * | 2/1999 | Kersey et al. | ................. 360/92 |
| 6,240,058 B1 | * | 5/2001 | Pitz et al. | ................. 369/30.39 |
| 6,473,371 B1 | * | 10/2002 | White | ..................... 369/30.72 |
| 6,515,822 B1 | * | 2/2003 | White et al. | ................... 360/92 |

* cited by examiner

*Primary Examiner*—Tianjie Chen
(74) *Attorney, Agent, or Firm*—Jay H. Maioli

(57) ABSTRACT

A tape library wherein a number of cassette tapes are accommodated and adjusted. One or more expansion units are connected to a basic unit. When a transport mechanism is within the basic unit, a control circuit section controls the transport mechanism by referencing a position reference point of the basic unit, and when the transport mechanism is within an expansion unit the control circuit section controls referencing a position reference point of the expansion unit. The control circuit section and the transport mechanism of the basic unit are interconnected by an elongated-belt-like flat cable which includes a plurality of conductors extending in parallel and joined with an insulating material, and when an expansion unit is coupled the cable need not be replaced, allowing coupling of an expansion unit and smooth transportation of a recording medium in the expansion unit to a recording and/or playback section by the transport mechanism.

5 Claims, 17 Drawing Sheets

F I G. 11
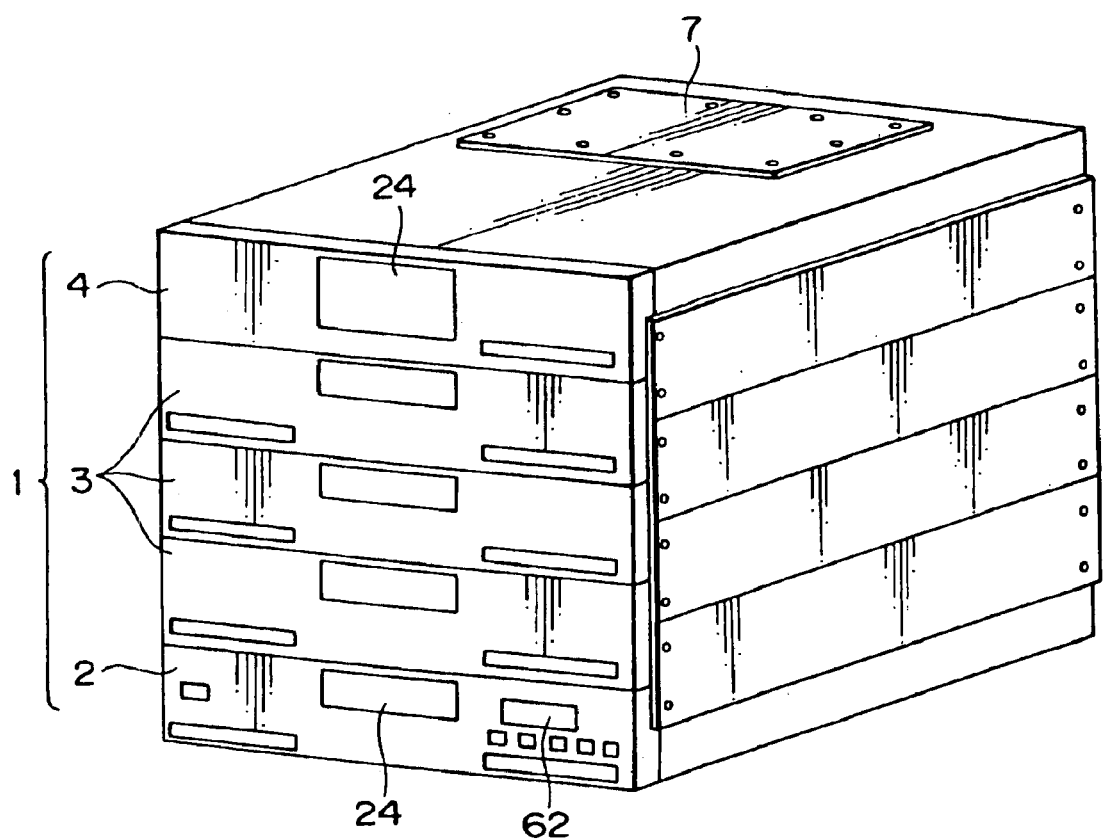

F I G. 15
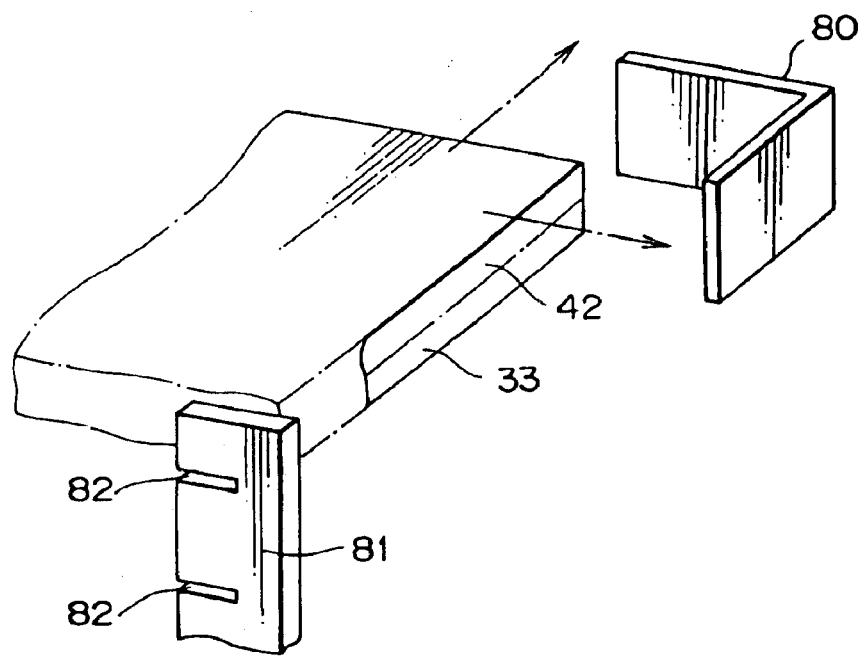
F I G. 16
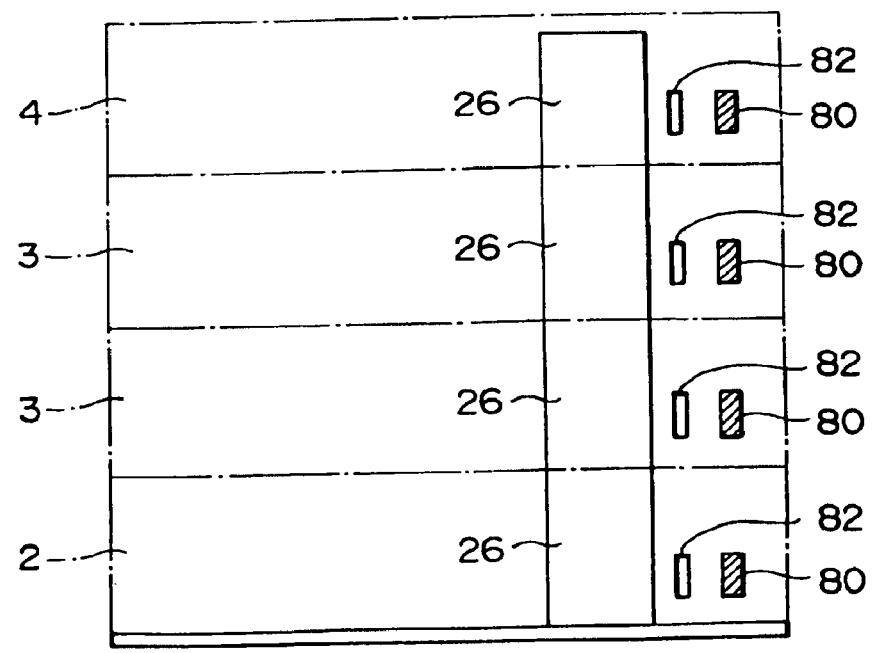

TAPE LIBRARY

BACKGROUND OF THE INVENTION

This invention relates to a recording and/or playback apparatus, and more particularly to a recording and/or playback apparatus called tape library which accommodates a plurality of cassette tapes and records or plays back data onto or from a selected one of the cassette tapes.

Where a large amount of data is handled, it is necessary to back up data of a server. Such backup is usually performed by recording data onto a compact disk. However, where a large recording capacity is required, a cassette tape, for example, an 8 mm tape or the like is used. Since much time is required for accessing to a cassette tape, a cassette tape is used to back up a large amount of data, while data which are used frequently are recorded onto and played back from a compact disk. A cassette tape has a storage capacity of approximately 50 to 100 GB.

A recording and/or playback apparatus called tape library for recording or playing back data onto or from tape cassettes requires an accommodation mechanism for accommodating cassette tapes, a recording and playback mechanism for recording or playing back the cassette tapes, and a feeding mechanism for feeding a cassette tape between the accommodation mechanism and the recording and playback mechanism.

A conventional tape library usually includes a cassette shelf which can accommodate a number of cassette tapes determined in advance, one or a plurality of drives for recording or playing back a cassette tape, and a feeding apparatus for feeding a cassette tape between the cassette shelf and the drive or drives.

However, since the conventional tape library can accommodate a fixed number of, for example, X, cassette tapes, if it is intended to accommodate more than X cassette tapes, then an apparatus of a special design must be ordered separately. Therefore, the intended apparatus cannot be acquired in short order and besides requires a high cost. Or else, if it becomes necessary to accommodate more than X cassette tapes after the tape library is purchased, then the tape library must be reconstructed. On the other hand, even where much less than X cassette tapes are required, the user is obliged to purchase a tape library which can accommodate X cassette tapes. In other words, the conventional tape library lacks in universality.

SUMMARY OF THE INVENTION

It is an object of the present invention to provide a tape library wherein the accommodated number of cassette tapes can be adjusted freely.

In order to attain the object described above, according to the present invention, a basic unit is designed to allow coupling thereto of an expansion unit through outer housings of them so that an arbitrary number of expansion units can be additionally coupled to the basic unit to assure an intended recording capacity of recording media.

More particularly, according to an aspect of the present invention, there is provided a tape library, including a basic unit, and one, two or more expansion units coupled to the basic unit, the basic unit including a housing, recording and/or playback means provided in the housing for recording or playing back data onto or from a recording medium, accommodation means provided in the housing for accommodating a plurality of recording media, feeding means provided in the housing for feeding a recording medium between the accommodation means and the recording and/or playback means, and guide means provided in the housing for guiding the movement of the feeding means, each of the expansion units including a housing, accommodation means provided in the housing for accommodating a plurality of recording media and guide means provided in the housing for guiding the movement of the feeding means of the basic unit between the accommodation means of the expansion unit and the recording and/or playback means of the basic unit.

Preferably, the accommodation means includes a rotatable member mounted for rotation around an axis substantially parallel to the coupling direction of the basic unit and the expansion unit or units, and a plurality of accommodation sections disposed on an outer periphery of the rotatable member for accommodating recording media.

Preferably, the accommodation sections are disposed in a plurality of stages in the direction of the axis.

The feeding means may include a movable table mounted for movement along the guide means in the direction of the axis, a translate table mounted for back and forth movement with respect to the accommodation sections or the recording and/or playback means on the movement table, and clamp means mounted on the translate table for releasably clamping a recording medium.

Preferably, the guide means of the basic unit and the guide means of the expansion unit or units which are coupled to each other are coupled to each other so as to have a length corresponding to the length of the basic unit and the expansion unit or units coupled to each other.

Where the basic unit includes an additional one or more recording and/or playback means, preferably the feeding means includes a slide table for moving the translate table to a position opposing to any of the recording and/or playback means of the basic unit.

Preferably, the accommodation sections further includes a fence provided on the outer side of the accommodation sections for preventing leaping out of a cassette tape from any of the accommodation sections.

The expansion unit or each or any of the expansion units may include recording and/or playback means for recording or playing back data onto or from a recording medium.

According to another aspect of the present invention, there is provided a basic unit, including a housing, recording and/or playback means provided in the housing for recording or playing back data onto or from a recording medium, accommodation means provided in the housing for accommodating a recording medium, feeding means provided in the housing for feeding the recording medium between the accommodation means and the recording and/or playback means, and guide means provided in the housing for guiding the movement of the feeding means, the accommodation means including a rotatable member mounted for rotation around an axis and a plurality of accommodation sections disposed on an outer periphery of the rotatable member for accommodating recording media, the housing having an inlet opening formed therein in an opposing relationship to at least one of the accommodation sections for allowing a recording medium to be inserted into or taken out from one of the accommodation sections.

Preferably, the basic unit further includes a control circuit section connected to the accommodation means, recording and/or playback means and feeding means for controlling the accommodation means, recording and/or playback means and feeding means, and, where one or more expansion units are connected to the basic unit, when the feeding means is positioned within the basic unit, the control circuit section controls the position and operation of the feeding means with reference to a position reference point provided in the basic unit, but when the feeding means is within the expansion unit or one of the expansion units, the control circuit section controls the position and operation of the feeding means with reference to a position reference point provided in the expansion unit.

Preferably, the control circuit section performs, when power supply to the basic unit is made available after one, two or more expansion units are coupled to the basic unit, an initialization process of detecting and storing the position reference point of each of the basic unit and the expansion units.

Preferably, the control circuit section communicates with a control circuit or circuits of the one, two or more expansion units coupled to the basic unit to discriminate the number of the expansion units coupled to the basic unit and stores the discriminated number prior to the detection of the position reference point of each of the basic unit and the expansion unit or units in the initialization process.

Preferably, the basic unit further includes a flat cable for interconnecting the control circuit section and the feeding means of the basic unit, the flat cable including a plurality of conductors extending in parallel to each other and joined together with an insulating material in such a manner as to be formed as an elongated belt, the flat cable being folded over at a substantially central portion in the longitudinal direction thereof, the flat cable being held at a portion in the proximity of the folded portion thereof by a fold holding member such that the angle by the opposite end portions of the flat cable with respect to the folded portion is variable in accordance with the distance between the control circuit section and the feeding means of the basic unit.

The fold holding member may be formed by molding of a synthetic resin material, and a portion of the fold holding member which is pressed by the flat cable when the opposite end portions of the flat cable are opened may have a shape of a cylindrical face around an axis parallel to a principal plane of the flat cable and perpendicular to the longitudinal direction of the flat cable. Alternatively, the fold holding member may be formed from a flexible material.

According to a further aspect of the present invention, there is provided an expansion unit which can be coupled to a basic unit when to be used, including a housing capable of accommodating recording and/or playback means for recording or playing back data onto or from a recording medium and accommodation means for accommodating a recording medium, at least one of the recording and/or playback means or the accommodation means being accommodated in the housing, a control circuit section connected to the recording and/or playback means and/or the accommodation means for controlling the recording and/or playback means and/or the accommodation means, and guide means for guiding, where the expansion unit is coupled to the basic unit, movement of feeding means for feeding a recording medium between the expansion unit and the basic unit.

Preferably, the housing has an inlet opening formed therein for allowing a recording medium to be inserted into or taken out from the accommodation section.

With the tape library, since it includes an expansion unit or units coupled to the base unit, the number of expansion units to be connected to the base unit can be increased or decreased in accordance with the recording medium accommodation capacity required for the tape library. Accordingly, the tape library according to the present invention is free from the disadvantage of the conventional tape library that, even if a greater accommodation capacity is required, the capacity of the tape library cannot be increased readily or conversely the tape library has an excessively great capacity and is not used efficiently. In short, the tape library of the present invention allows suitable adjustment of the accommodation capacity.

Further, in the tape library, where one or more expansion units are connected to the basic unit, when the feeding means is positioned within the basic unit, the control circuit section controls the position and operation of the feeding means with reference to the position reference point provided in the basic unit, but when the feeding means is within the expansion unit or one of the expansion units, the control circuit section controls the position and operation of the feeding means with reference to the position reference point provided in the expansion unit.

Accordingly, in the tape library, even if the positions of the housings of the basic unit and the expansion unit or units are displaced from each other, the feeding means can execute necessary operation in accordance with the position of the accommodation means of any unit without being influenced by the positional displacement between the housings.

Further, in the tape library, the control circuit section and the feeding means of the basic unit are interconnected by the flat cable which includes a plurality of conductors extending in parallel to each other and joined together with an insulating material in such a manner as to be formed as an elongated belt, and the flat cable is folded over at a substantially central portion in the longitudinal direction thereof and held at a portion in the proximity of the folded portion thereof by a fold holding member such that the angle by the opposite end portions of the flat cable-with respect to the folded portion is variable in accordance with the distance between the control circuit section and the feeding means of the basic unit.

Accordingly, while a sufficient length of the flat cable is assured, occurrence of such a trouble that the cable occupies an excessively large space or becomes entangled is prevented.

Therefore, when an expansion unit is coupled to the base unit of the tape library wherein the expansion unit and the basic unit can be coupled to each other at the housings thereof, the cable for interconnecting the feeding means and the control circuit section need not be replaced. Further, when the tape library is used without connecting an expansion unit to the basic unit thereof, occurrence of such a trouble that the cable occupies an excessive great space or is entangled can be prevented.

In summary, the present invention can provide a tape library which includes a basic unit to which an expansion unit can be coupled at housings thereof and allows smooth feeding of a recording medium in the expansion unit to the recording and/or playback means by the feeding means of the basic unit.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 11 is a perspective view of the tape library including the basic unit of FIG. 1 and four expansion units coupled to each other;

FIG. 15 is a perspective view showing a position reference point of the tape library;

FIG. 16 is a side elevational view showing the position reference points of different units of the tape library;

DETAILED DESCRIPTION OF THE PREFERRED EMBODIMENT

1. General Configuration of the Tape Library

An appearance of a tape library to which the present invention is applied is shown in FIG. 11. The tape library may be implemented as various combinations of several units, and FIG. 11 shows the tape library which is one of such possible combinations. Referring to FIG. 11, the tape library 1 shown includes a basic unit 2 positioned at the bottom thereof, three expansion units 3, and an expansion unit 4 positioned at the top thereof.

The basic unit signifies a unit essentially required for the tape library, and the expansion units are those units which need not necessarily be provided but may be provided in suitable quantity in accordance with the number of cassette tapes used frequently.

Figure 12:
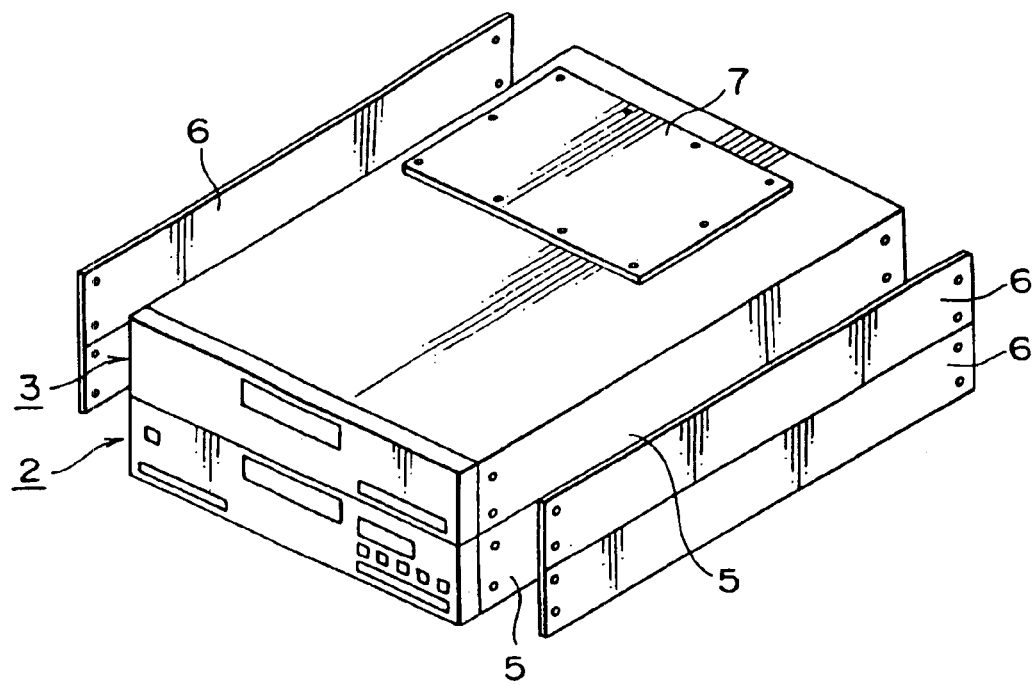
FIG. 12 is a perspective view showing the basic unit of FIG. 1 and an expansion unit before they are coupled to each other.
Figure 13:
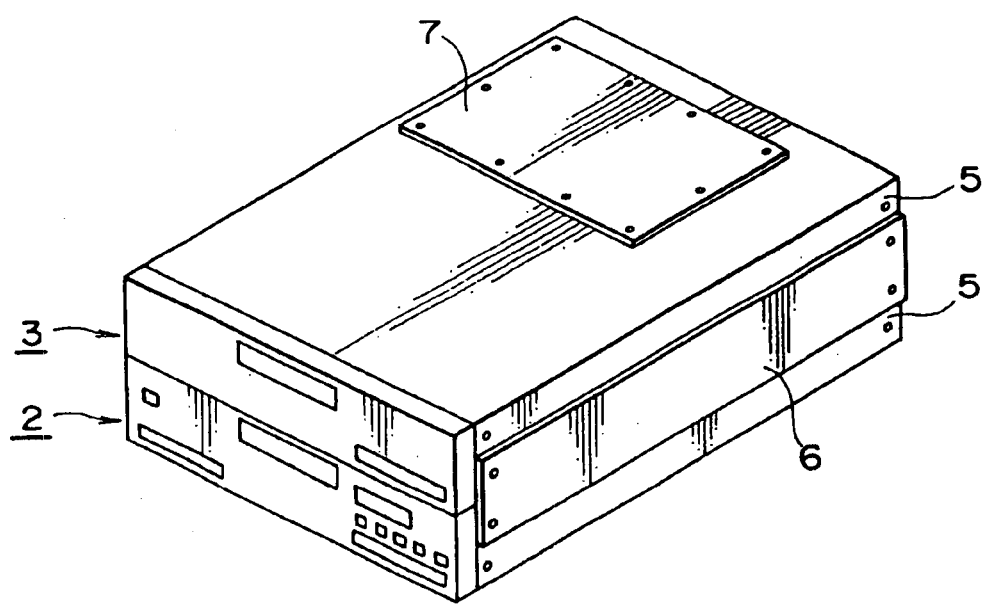
FIG. 13 is a perspective view showing the basic unit of FIG. 1 and the expansion unit of FIG. 12 after they are coupled to each other.

Coupling of units is described by way of an example of coupling between the basic unit 2 and the expansion units 3 shown in FIG. 11. Referring to FIG. 12, each of the basic unit 2 and the expansion units 3 includes a housing 5 in which various parts are accommodated. The housings 5 of two units are coupled by removing a pair of connection plates 6 attached to the opposite side faces of each of the housings 5 each using four screws, disposing a pair of connection plates 6 such that they extend over the adjacent housings 5 as seen in FIG. 13 and screwing four screws through each of the connection plates 6. Such coupling is repeated to couple the five housings 5 to each other to form the tape library 1 shown in FIG. 11.

Through holes not shown FIGS. 11 to 13 are formed at individually corresponding positions on an upper face and a lower face of each of the housings 5 near the rear face, and before the housings 5 are coupled to each other, a lid 7 is attached to each of the upper face and the lower face of each of the housing 5 such that it closes up the through hole. Then, in the coupled state of the housing 5, only the lid 7 on the lower face of a lowermost one of the housings 5 and the lid 7 on the upper face of an uppermost one of the housings 5 are attached while the other lids 7 are removed such that the insides of the five housings 5 are communicated with each other through the through holes. This is hereinafter described more particularly.

The description of the internal structure of the tape library is given in the following procedure.

Figure 1:
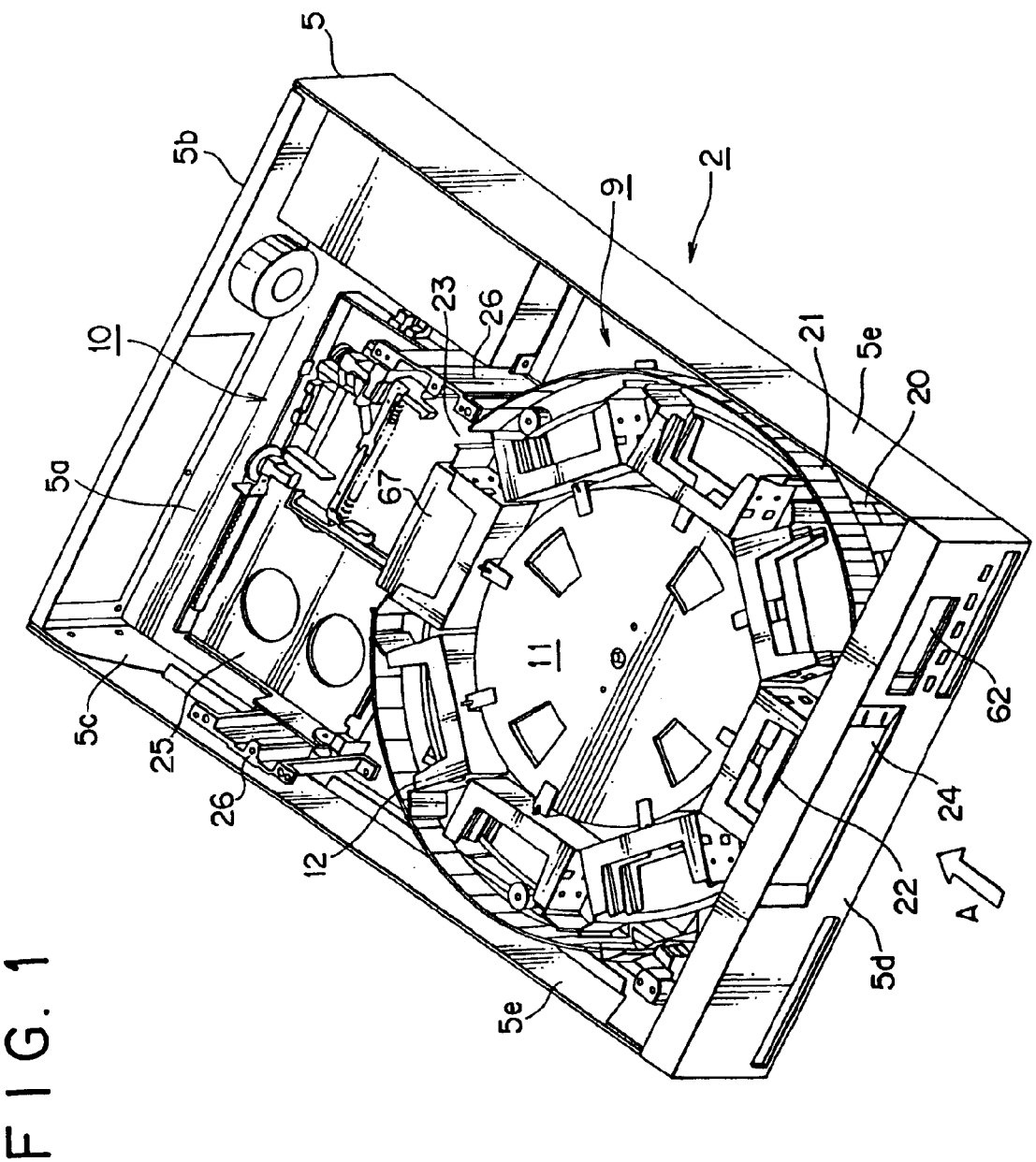
FIG. 1 is a perspective view of a basic unit of a tape library to which the present invention is applied.
Figure 2:
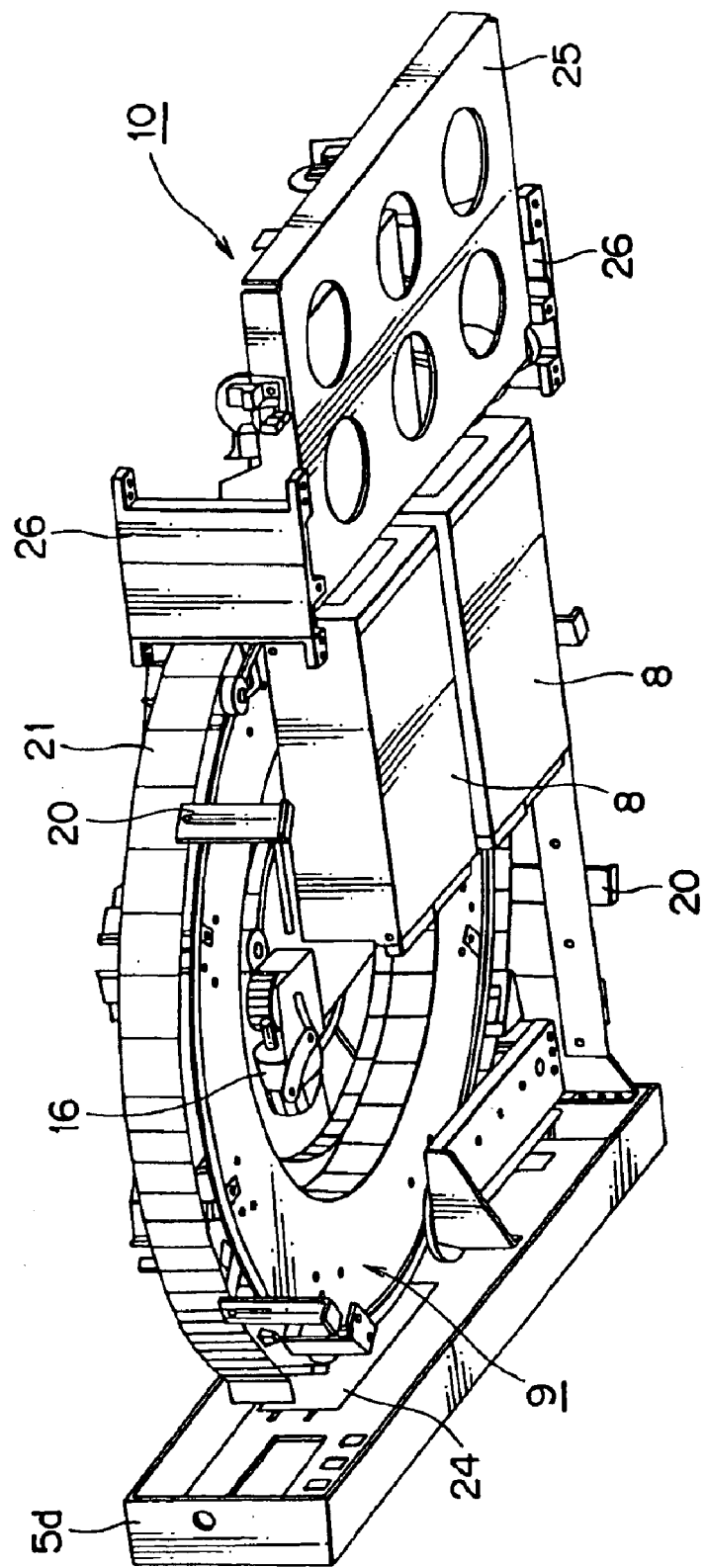
FIG. 2 is a perspective view of the basic unit of FIG. 1 as viewed obliquely from below.

*Basic Unit
  Housing
  Cassette shelf
  Drive
  Transport unit
    Lift table
    Slide table
    Translate table
    Clamp Unit
*Expansion Unit
*Coupling Section and Coupling Method between Basic Unit and Expansion Unit
*Operation
  Accommodation and takeout of cassette tape into and from cassette shelf
  Takeout of cassette tape from cassette shelf
  Transportation of cassette tape to drive
  Returning of cassette tape from drive to cassette shelf 2. Basic Unit First, the basic unit is described. Referring to FIGS. 1 and 2, the basic unit 2 includes a housing 5, a pair of drives 8 serving as recording and/or playback means for recording or playing back data onto or from a cassette tape serving as a recording medium, a cassette shelf 9 serving as accommodation means for accommodating cassette tapes thereon, and a transport mechanism 10 serving as feeding means for feeding a cassette tape between the cassette shelf 9 and a drive 8. The drives 8, cassette shelf 9 and transport mechanism 10 are accommodated in the housing 5.

2-a. Housing

Figure 10:
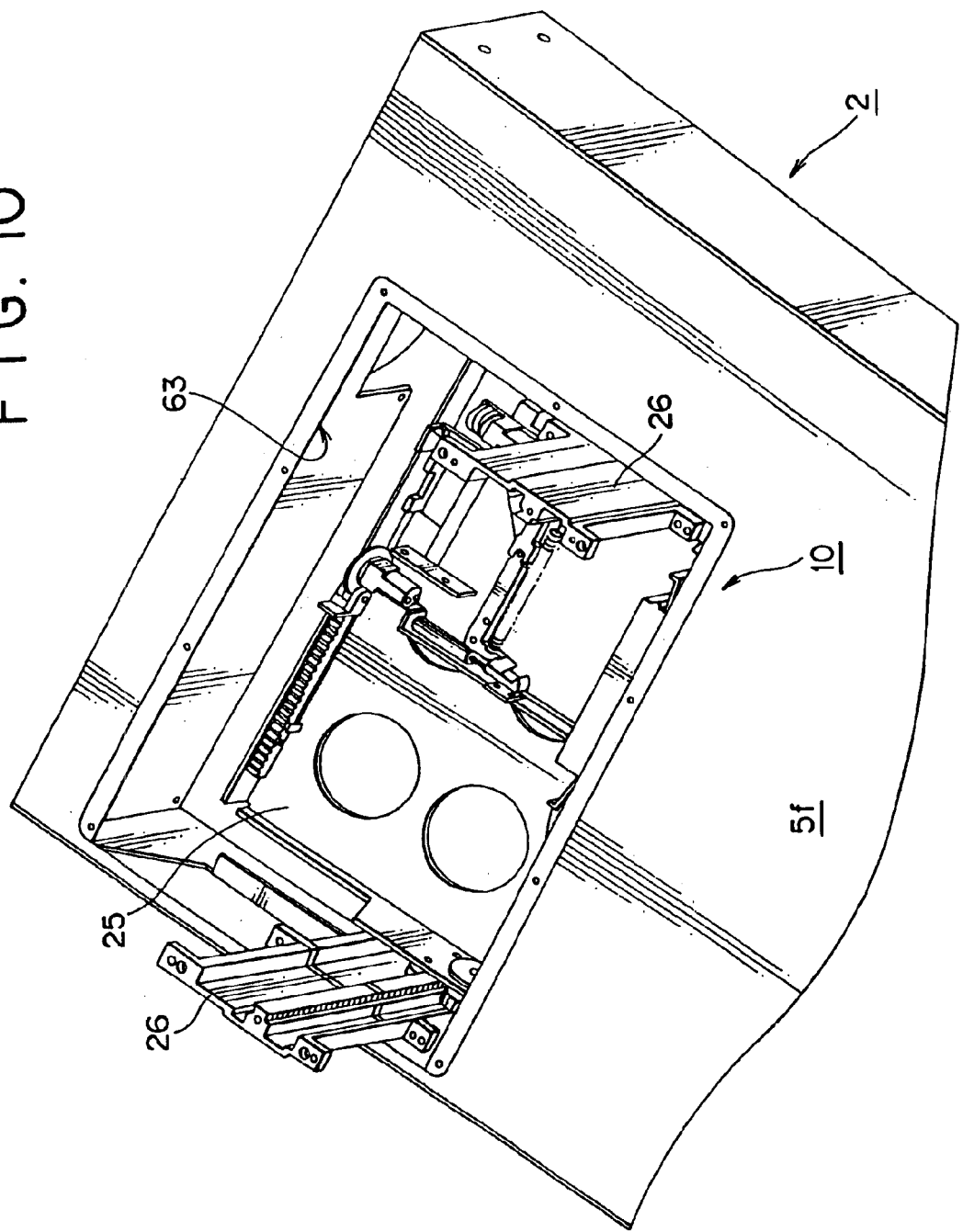
FIG. 10 is a perspective view showing a top plate mounted on the rack pillars shown in FIG. 9.

Referring to FIG. 1, the housing 5 includes a bottom plate 5a, a back plate 5b and a pair of side plates 5c formed as a unitary member, a front panel 5d for covering the front of the housing 5, a pair of auxiliary plates 5e for covering openings of the side plates 5c, and a top plate 5f shown in FIG. 10.

2-b. Drive

Referring to FIGS. 1, 2, 4 and 6, the drives 8 are disposed at an intermediate portion in the forward and backward directions at a left side portion of the bottom plate 5a of the housing 5. A face indicated by an arrow mark A in FIG. 1 is the front face of the basic unit 2, and as can be seen from FIG. 2, inlet openings of the drives 8 for a cassette tape are provided on the rear side of the drives 8.

2-c. Cassette Shelf

Figure 3:
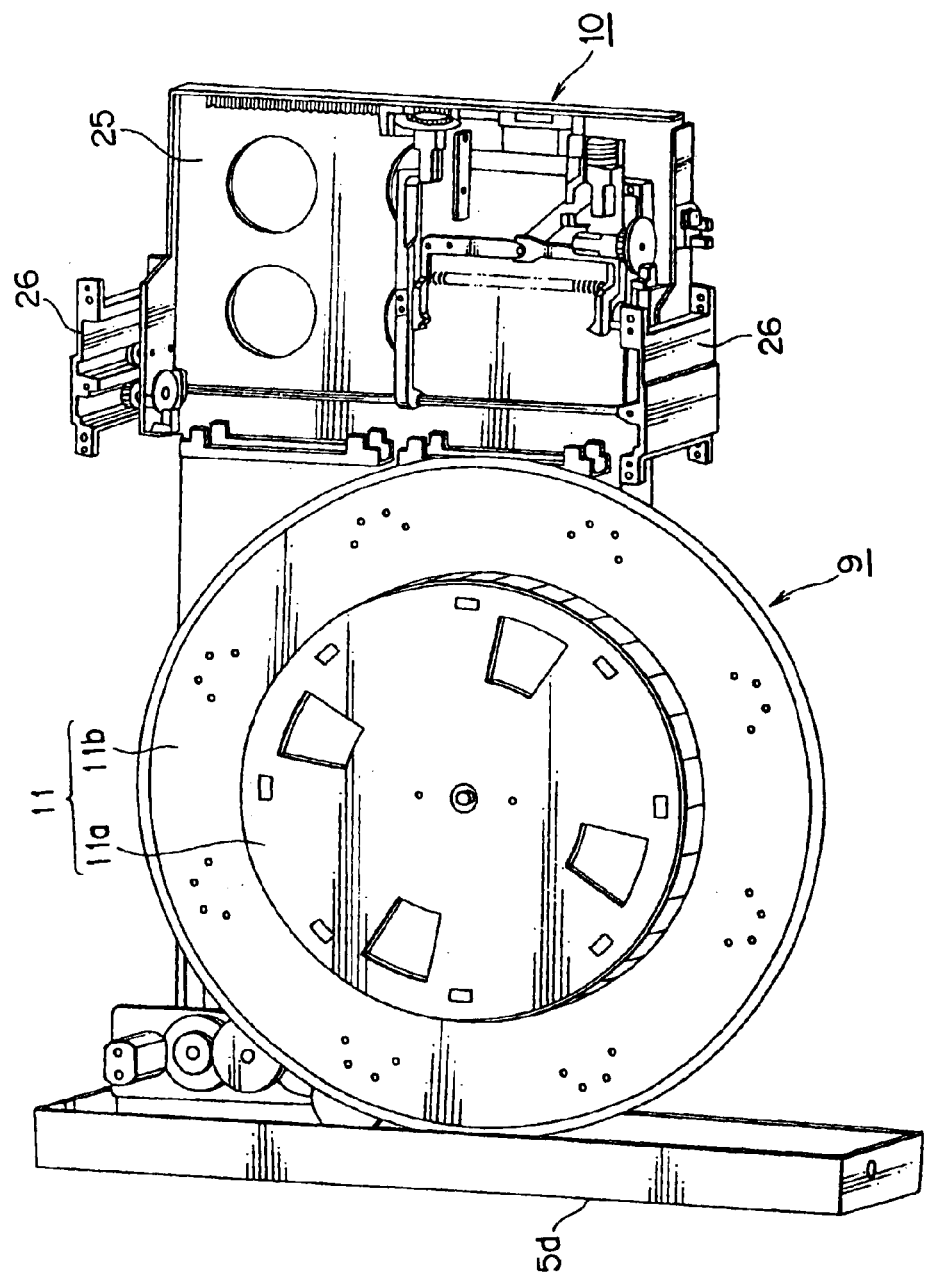
FIG. 3 is a perspective view of a table that is a component of a cassette shelf of the basic unit of FIG. 1.
Figure 4:
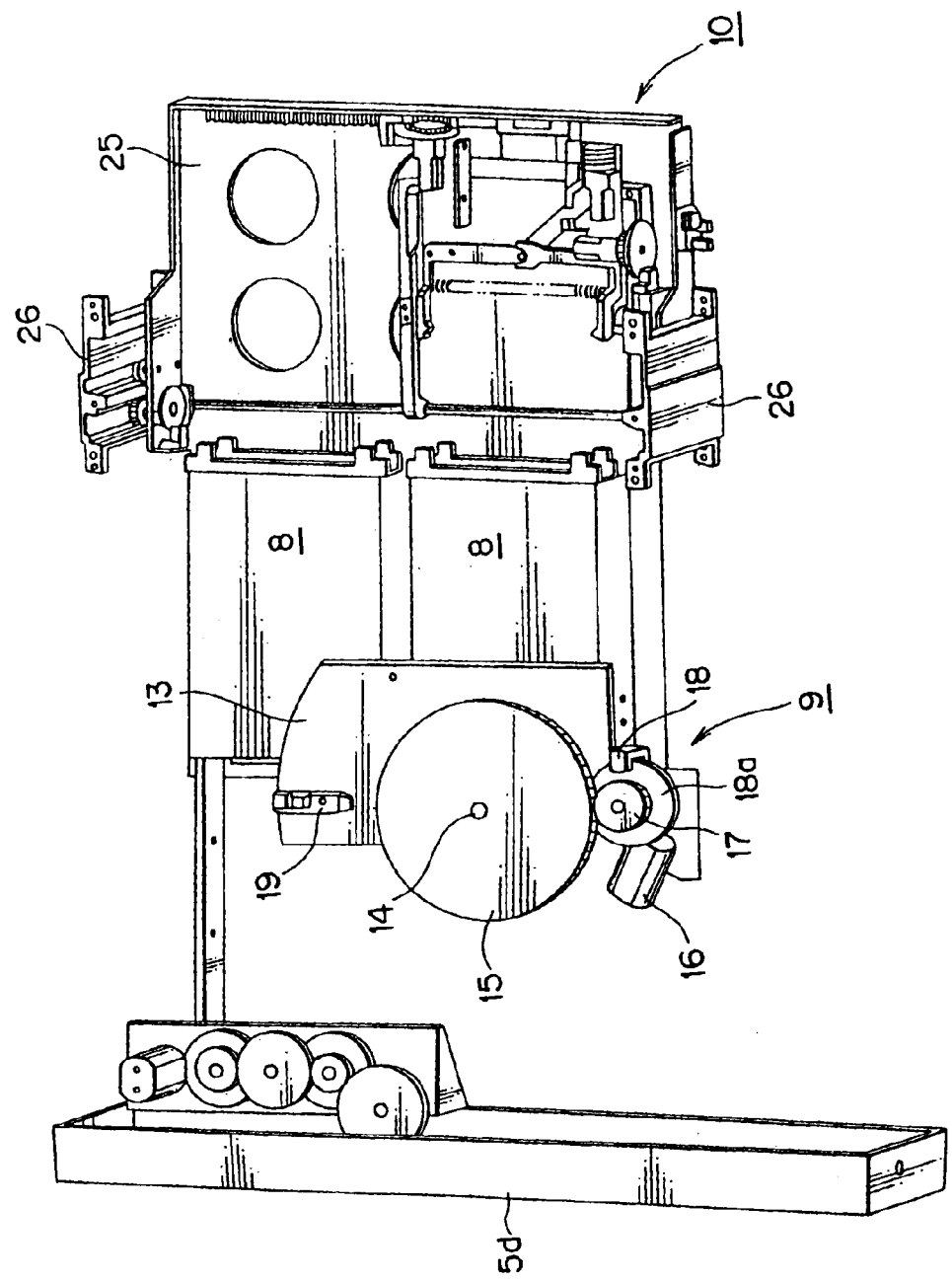
FIG. 4 is a perspective view of the basic unit of FIG. 1 with the table of FIG. 3 removed.

Referring to FIGS. 1, 2 which is viewed from below and 6, the cassette shelf 9 is disposed adjacent the front face of the housing 5 above the drives 8. Referring to FIG. 3, a table 11 serving as a rotatable member is mounted for rotation and includes a circular supporting portion 11a and a receiving portion 11b. The receiving portion 11b is formed with a ring-like shape and positioned lower than the supporting portion 11a on the outer side of the supporting portion 11a. Referring to FIG. 1, a plurality of, eight in the arrangement shown, case blocks each including a pair of cases 12 integrally coupled to each other in two upper and lower stages and each serving as an accommodation section for accommodating a cassette tape 67 therein are mounted on the receiving portion 11b and coupled in a circumferential direction to each other. The cases 12 are open to the radially outer side.

A mechanism for driving the table 11 is described. Referring to FIG. 2 in which the cassette shelf 9 is viewed from below and FIG. 4 in which the cassette shelf 9 is shown with the table 11 removed, a vertical shaft 14 serving as a rotatable shaft extends through a mounting plate 13 and is coupled at a lower end thereof to the upper face of the bottom plate 5a of the housing 5, and a center gear 15 having a comparatively large external dimension is mounted for rotation on the vertical shaft 14. The supporting portion 11a of the table 11 is integrally coupled at a lower face thereof to an upper face of the center gear 15. A motor 16 is mounted on an upper face of the bottom plate 5a of the housing 5, and an output power shaft of the motor 16 and the center gear 15 are operatively connected to each other through a gear 17 and so forth.

To stop rotation of the table 11 at a predetermined position, a rotary plate 18a integral with the gear 17, an encoder 18 and a position sensor 19 are provided. Further, to prevent a cassette tape from dropping from within a case 12 on the rotating table 11 by a centrifugal force, a pair of fences 21 are mounted on the bottom plate 5a of the housing 5 by means of a plurality of mounting metal members 20 such that they draw a circle as seen in FIGS. 1 and 2. The gap between the fences 21 and the cassette tapes in the cases 12 is set to a very small value. As can be seen from FIG. 1, to allow a cassette tape inserted in the inside of a case 12 by manual operation from the front face of the housing 5 to be transported from the rear face side of the cassette shelf 9 and loaded into a drive 8 below by means of the transport mechanism 10, the fences 21 are designed such that they do not exist on the front face side and the rear face side of the cassette shelf 9 and thus define an outer gate 22 and an inner gate 23. The front panel 5d on the front of the housing 5 has an inlet opening 24 formed therein in an opposing relationship to the outer gate 22. Through the inlet opening 24, any of cassette tapes in two corresponding cases 12 placed one on the other can be removed. An LCD display section 62 is provided on the front panel 5d alongside the inlet opening 24.

2-d. Transport Unit

Figure 6:
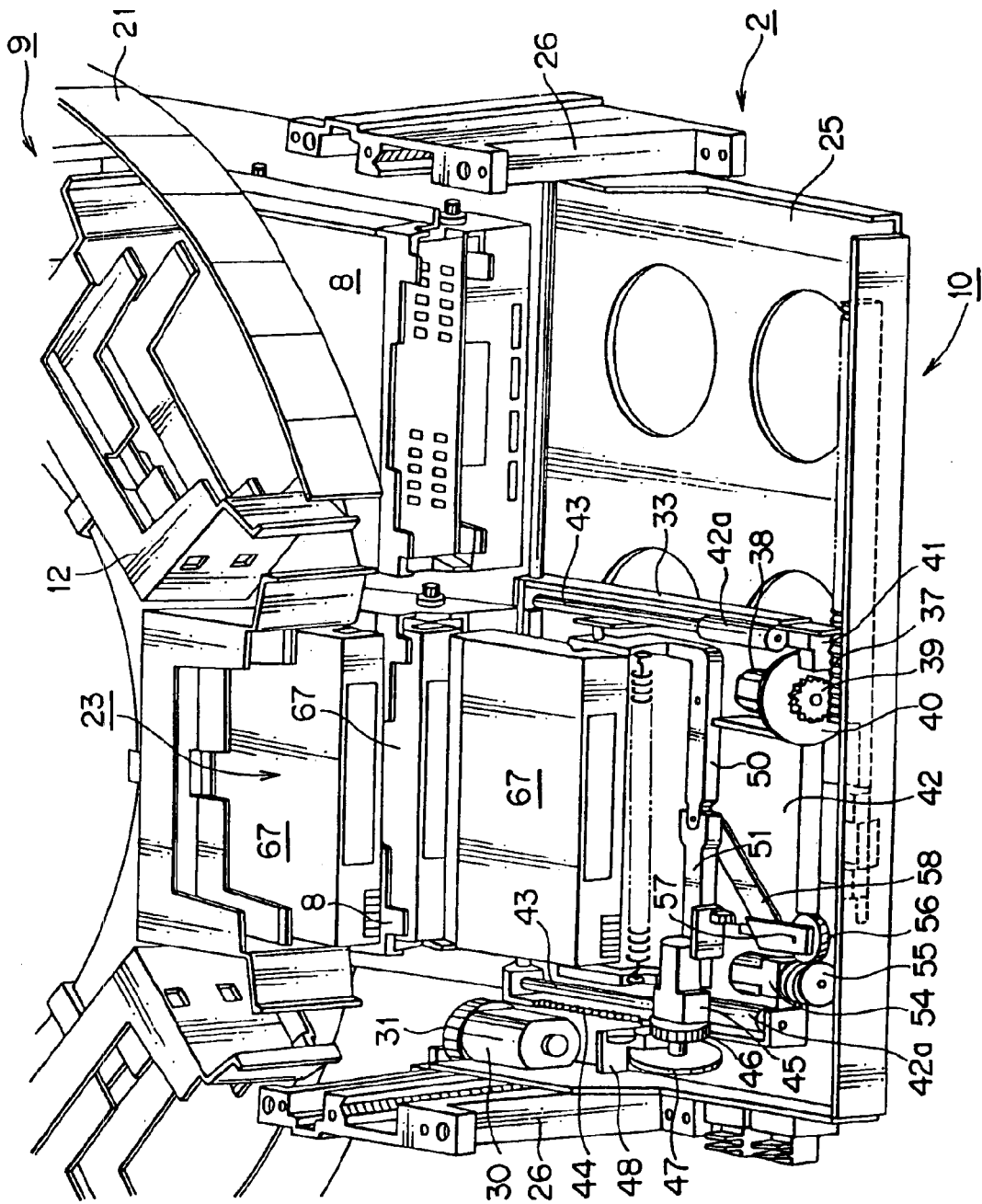
FIG. 6 is a perspective view showing the cassette shelf, drives and the transport mechanism of the basic unit of FIG. 1.

Referring to FIGS. 1, 2 and 6, the transport mechanism 10 is provided to feed a cassette tape between the cassette shelf 9 and a drive 8 and disposed at a left portion of the rear face side of the cassette shelf 9 and the drives 8. The structure of the transport mechanism 10 is described below.

2-d-1. Lift Table

Figure 5:
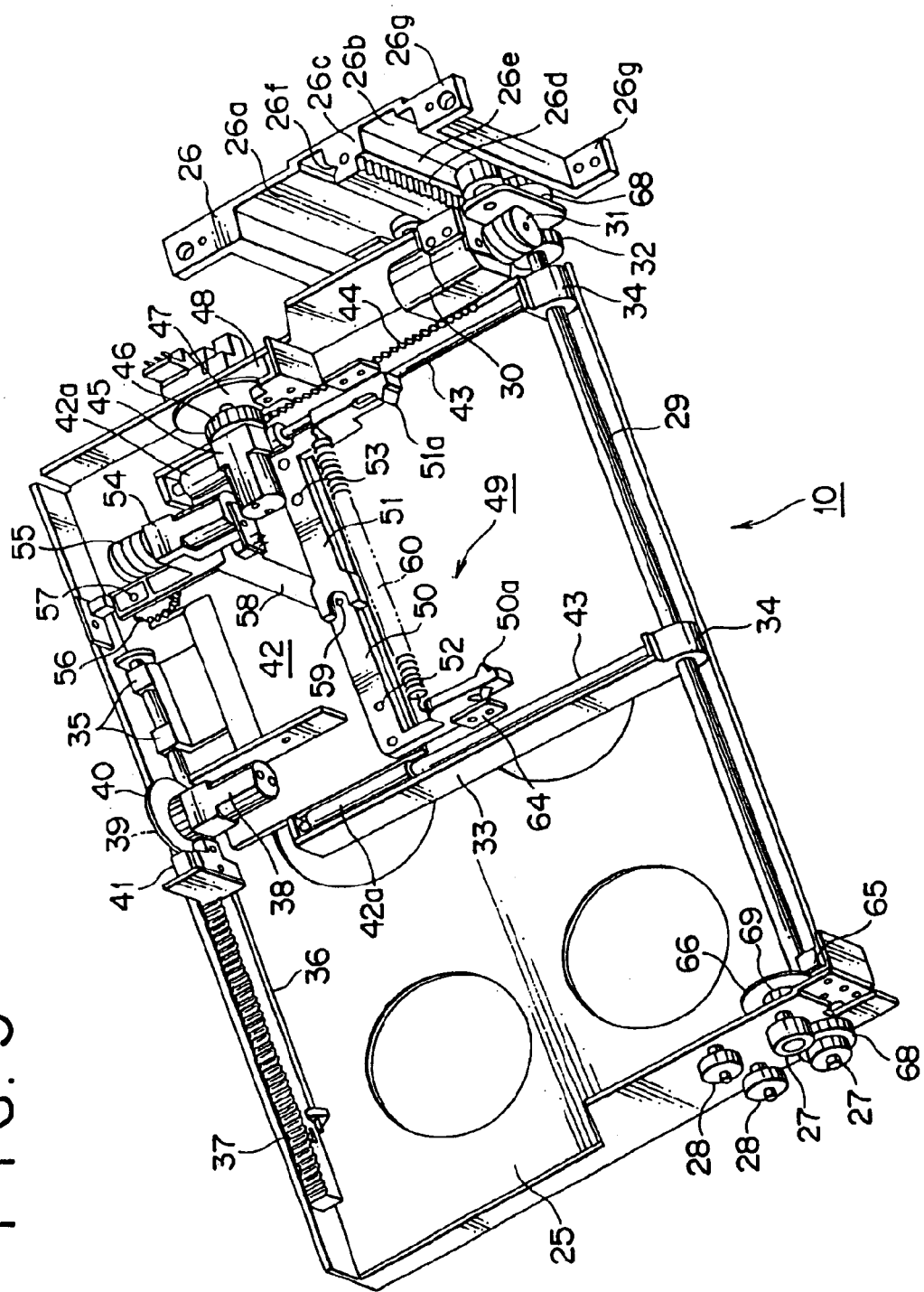
FIG. 5 is a perspective view showing a transport mechanism of the basic unit of FIG. 1.

Referring to FIGS. 5 and 6, the transport mechanism 10 includes a lift table 25 serving as a movable table, a slide table 33, a translate table 42, and a clamp mechanism 49. The transport mechanism 10 is guided by a pair of rack pillars 26 serving as guide means for guiding the lift table 25 in upward and downward directions.

Referring to FIG. 5, each of the rack pillars 26 has a rack portion 26c between a pair of inside grooves 26a and 26 b. The rack portion 26c has a rack 26d and a rolling face 26e on one side thereof and has a V-shaped groove 26f on the other wide thereof. Two pairs of coupling portions 26g are formed at the four corners of the rack pillar 26 such that they extend horizontally outwardly. Each of the rack pillars 26 is mounted uprightly on the lid 7 by means of screws screwed into the rack pillars 26 from below the lid 7 which closes up a through hole (communicating portion) 63 (refer to FIG. 7) of the bottom plate 5a. Each of the rack pillars 26 is coupled at an upper portion thereof to the lid 7 by means of screws screwed from above the lid 7 which closes up the through hole 63 (refer to FIG. 10) of the top plate 5f.

A configuration for guiding the lift table 25 for upward and downward movement along the rack pillars 26 is described. A pair of guide rollers 27 for rolling on the rolling face 26e are mounted for rotation at upper and lower portions of each of left and right portions of the lift table 25 adjacent the front face. Meanwhile, a pair of guide rollers 28 are mounted for rotation at upper and lower positions of each of the left and right walls of the lift table 25 adjacent the front face such that they roll in the V-shaped groove 26f to move upwardly and downwardly to position the lift table 25 in the leftward and rightward directions. Thus, the rack portion 26c is held between the two sets of guide rollers 27 and 28 to position the lift table 25 in the leftward and rightward directions.

Now, a structure for driving the lift table 25 is described. Referring to FIG. 5, a connection shaft 29 is mounted for rotation on the lift table 25 and has a pair of pinions 68 coupled integrally to the opposite ends thereof such that they mesh with the left and right racks 26d. A motor 30 is mounted on one side of the lift table 25, and a worm gear 31 is coupled to an output power shaft of the motor 30 and held in meshing engagement with a helical gear 32 securely mounted on the connection shaft 29. An encoder 65 for detecting the position of the lift table 25 to stop rotation of the motor 30 is mounted on the lift table 25, and a rotary plate 66 of the encoder 65 is operatively connected to the connection shaft 29 through a gear 69.

2-d-2. Slide Table

The slide table 33 is mounted for movement in the leftward and rightward directions on the lift table 25. The slide table 33 is required where a plurality of drives 8 serving as recording and/or playback means for recording or playing back data are provided in a planar arrangement on the basic unit 2.

In particular, the connection shaft 29 which serves also as a guide extends through a pair of slide bearings 34 at a front portion of the slide table 33 and a guide rod 36 mounted on the lift table 25 extends through a pair of slide receivers 35 fixed to a rear portion of the slide table 33 such that the slide table 33 can be slidably moved in the leftward and rightward directions.

Now, a structure for driving the slide table 33 is described. A rack 37 is mounted integrally on the rear face side of the lift table 25. The guide rod 36 is mounted below the rack 37. A motor 38 is mounted on the slide table 33, and a driving gear 39 is coupled to an output power shaft of the motor 38 and held in meshing engagement with the rack 37. Reference numeral 40 denotes a rotary plate integral with the driving gear 39, and 41 an encoder.

2-d-3. Translate Table

The translate table 42 is mounted for back and forth movement toward the inner gate 23 or a drive 8 on the slide table 33. In particular, a pair of guide rods 43 are fixed at the opposite ends thereof to left and right portions of the slide table 33 such that they extend in the forward and backward directions, and the guide rods 43 are fitted in a pair of left and right bearing portions 42*a* of the translate table 42 to support the translate table 42 for reciprocating movement in the forward and backward directions.

Now, a structure for driving the translate table 42 is described. A rack 44 is mounted integrally on the right side of the slide table 33. A motor 45 is mounted on the right side of the translate table 42, and a driving gear 46 is coupled to an output power shaft of the motor 45 and held in meshing engagement with the rack 44. Reference numeral 47 denotes a rotary plate integral with the driving gear 46, and 48 an encoder.

2-d-4. Clamp Mechanism

The clamp mechanism 49 for clamping a cassette tape is mounted on the translate table 42. A configuration of the clamp mechanism 49 is described below. A pair of pickers 50 and 51 are supported for pivotal motion on the translate table 42 by a pair of fixed studs 52 and 53 provided uprightly on the translate table 42. The pickers 50 and 51 have an L-shaped configuration and individually have pawls 50*a* and 51*a* formed on the inner sides of outer end portions thereof for fitting with recessed portions on side faces of a cassette tape. A configuration for opening and closing the pawls 50*a* and 51*a* is described. A motor 54 is mounted on the translate table 42. A worm 55 is coupled to an output power shaft of the motor 54 and held in meshing engagement with a worm wheel 56. A pin 57 is provided uprightly at an eccentric position of the worm wheel 56. The pin 57 is fitted for turning motion at an end portion of a lever 58 of an L-shaped configuration, and another pin 59 is provided uprightly at the other end portion of the lever 58. The pickers 50 and 51 are supported for pivotal motion at inner end portions thereof on the pin 59. A spring 60 extends between and biases the pickers 50 and 51 so that outer end portions of the pickers 50 and 51 may be closed. A pair of passage sensors 64 are fixed in the proximity of the guide rods 43 on the slide table 33 and detect that the pickers 50 and 51 pass by the passage sensors 64 by forward or backward movement on the slide table 33.

Figure 14:
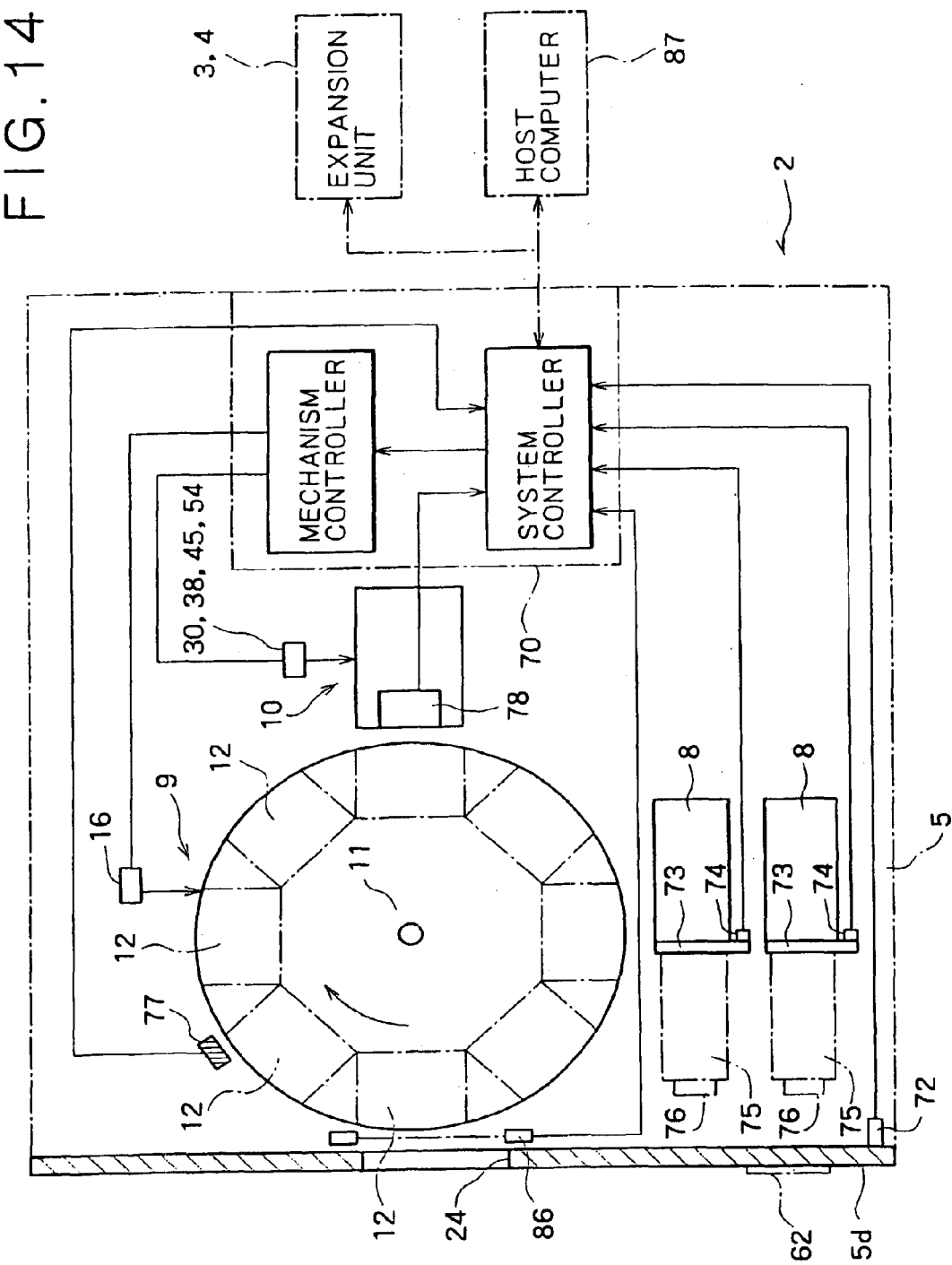
FIG. 14 is a block diagram of the basic unit of FIG. 1.

A circuit system of the basic unit 2 is shown in FIG. 14. Referring to FIG. 14, a control circuit section 70 for controlling the basic unit 2 is provided in the housing 5. The control circuit section 70 includes a system controller and a mechanism controller. The mechanism controller controls the motor 16 of the cassette shelf 9 and the motors 30, 38, 45 and 54 of the transport mechanism 10 described hereinabove, and the system controller controls the drives 8 through connectors 74. Though not particularly described, a MIC antenna 77, a bar code reader 78 and a cassette-in detection sensor 86 are connected to the system controller and send respective detection signals to the system controller. The cassette-in detection sensor 86 optically detects presence of a tape cassette when the tape cassette is inserted through the inlet opening 24 provided in the front panel 5*d*.

Further, the LCD display section 62 provided on the front panel 5*d* of the housing 5 is connected to the system controller through a connector 72, and the system controller controls contents to be displayed by the LCD display section 62.

Further, the system controller is connected to circuit control sections in the expansion units 3 and 4, which are hereinafter described, and an external host computer 87 and communicates information signals to and from the circuit control sections and the host computer 87.

3. Expansion Unit

Where the basic unit 2 described above does not have sufficient cases for accommodating cassette tapes, it is necessary to additionally provide a cassette shelf or shelves. Further, if many expansion units are additionally provided in the upward and downward directions, then much time may be required for transportation of a cassette tape from the expansion unit on the top to the basic unit on the bottom, and it may be desired to provide one or more drives in an expansion unit at a high location.

Therefore, three different expansion units may be possible including an expansion unit wherein only a cassette shelf is provided in the housing, another expansion unit wherein only a drive is provided in the housing, and a further expansion unit wherein both of a cassette shelf and a drive are provided in the housing. Each of such expansion units has a feeding space provided therein for allowing, when it is coupled to the basic unit, the transport mechanism of the basic unit to function between the housings of them coupled to each other.

Figure 7:
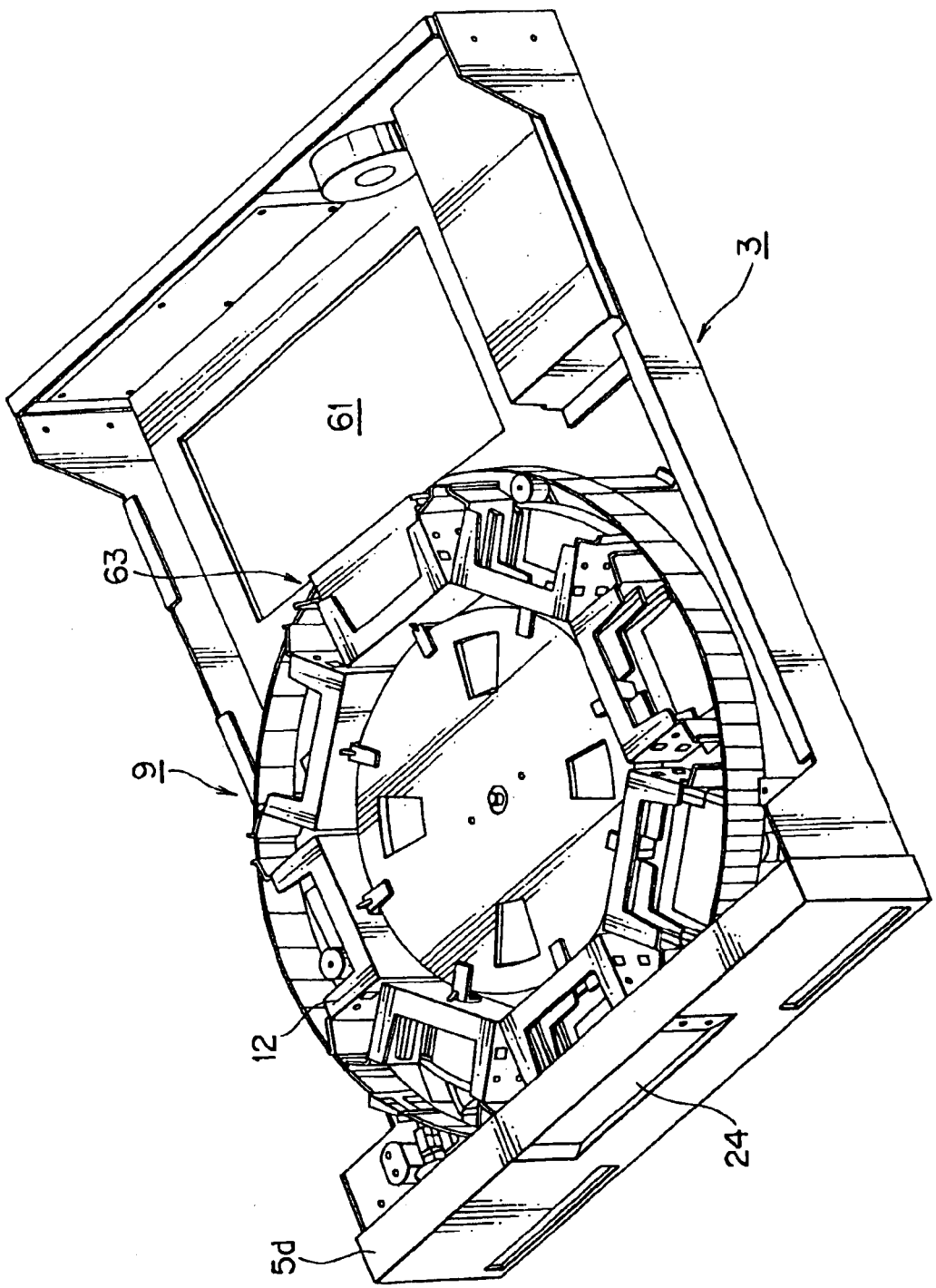
FIG. 7 is a perspective view of an expansion unit for use with the tape library.

Referring to FIG. 7, each of the expansion units 3 shown in FIG. 11 includes, in the housing 5 thereof, a cassette shelf 9 having two stages of cases similar to that described above and a pair of drives not shown below the cassette shelf 9. The elements mentioned are similar to those of the basic unit 2. The expansion unit 3 has a feeding space 61 provided therein such that the lift table 25 of the transport mechanism 10 of the basic unit 2 can move upwardly and downwardly also in the inside of the expansion unit 3 to transport a cassette tape. Further, a pair of rack pillars not shown are provided in the expansion unit 3 for allowing the lift table 25 to move upwardly and downwardly therealong.

Figure 8:
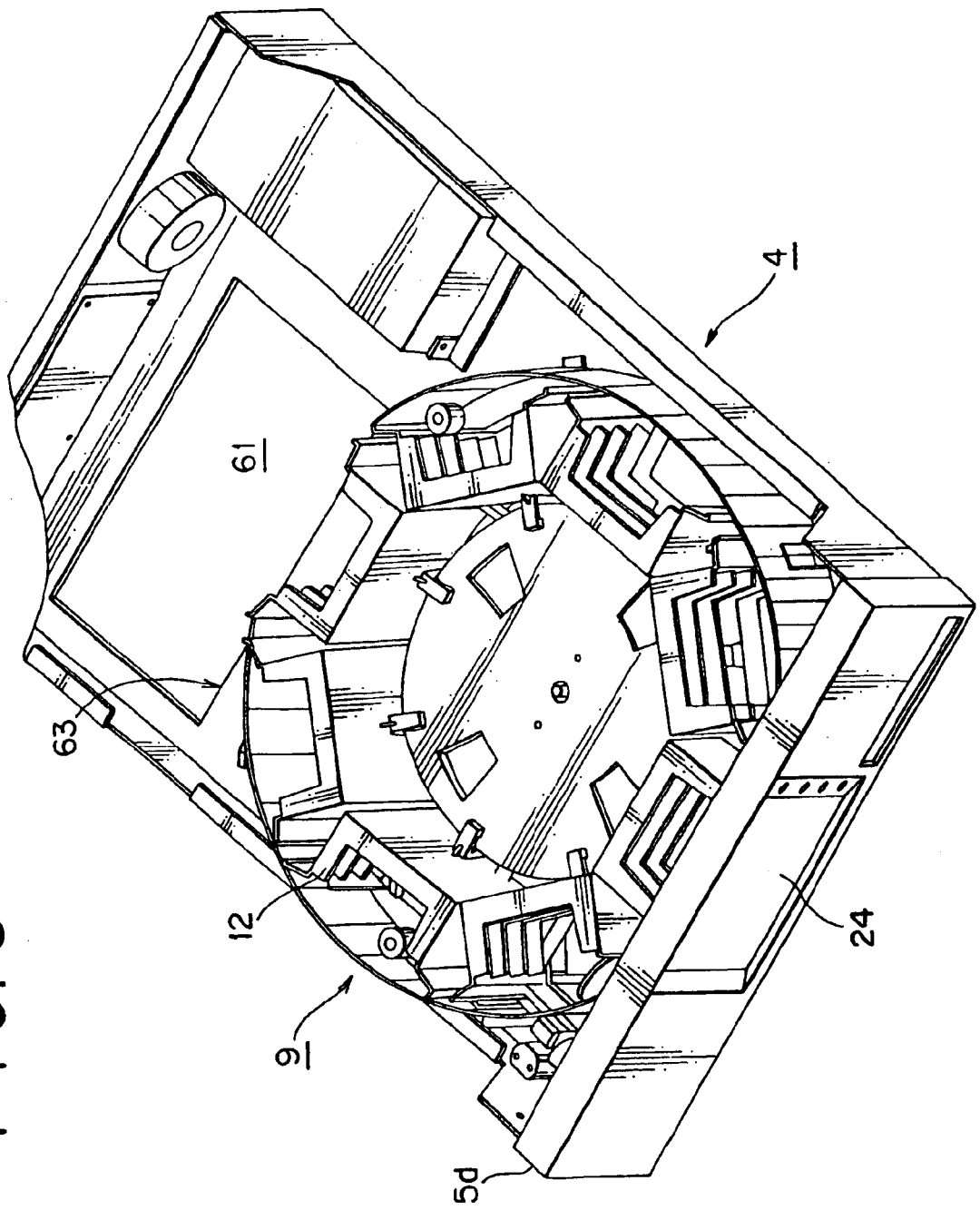
FIG. 8 is a similar view but showing another expansion unit for use with the tape library.

Now, the expansion unit 4 on the top shown in FIG. 11 is described. Referring to FIG. 8, the expansion unit 4 does not include a drive, but the number of cases 12 of the cassette shelf 9 is increased as much. Thus, the cassette shelf 9 of the expansion unit 4 has four cases 12 as seen in FIG. 8. The expansion unit 4 further has a feeding space 61 for allowing a cassette tape to be transported therein similarly to the expansion units 3 shown in FIG. 7. The expansion unit 4 further includes a pair of rack pillars not shown similarly. Since the cassette shelf 9 includes the four cases 12, also the inlet opening 24 has a height corresponding to the height of the four cases 12 placed one on another. It is to be noted that the expansion units 3 and 4 do not include the LCD display section 62.

4. Coupling Section and Coupling Method between Basic Unit and Expansion Unit As described hereinabove, such a through hole 63 as shown in FIG. 10 is formed at mutually corresponding positions of the bottom plate 5*a* and the top plate 5*f* of each of the housings 5, and the housings 5 of the basic unit 2 and the expansion units 3 and 4 shown in FIG. 11 are communicated with each other at the through holes 63 (communicating portions) thereof. Therefore, the feeding spaces 61 of the housing 5 are mutually connected to each other.

Figure 9:
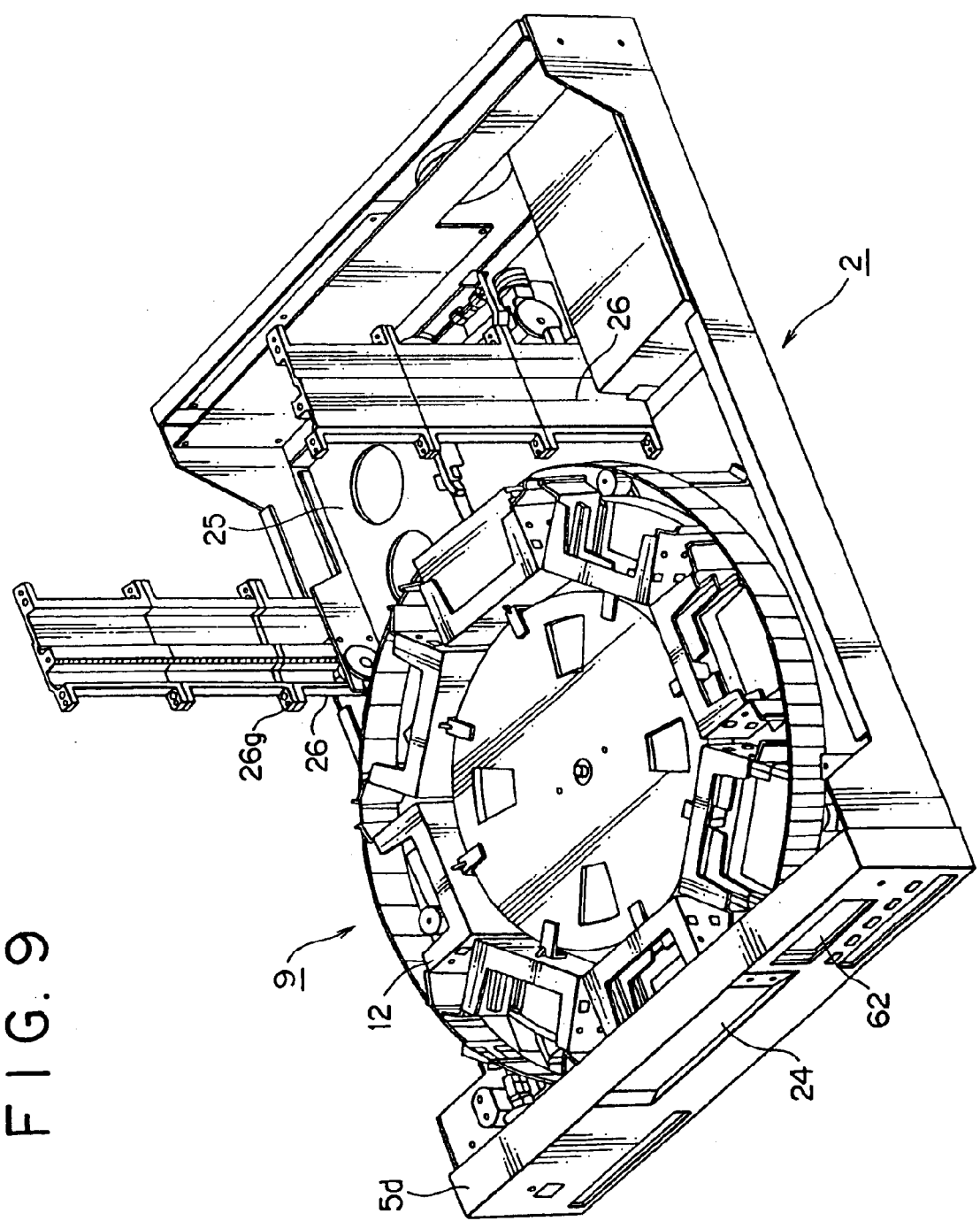
FIG. 9 is a perspective view showing a plurality of rack pillars mounted on the basic unit of FIG. 1.

When an expansion unit or units 3 and/or 4 are to be connected to the basic unit 2, a number of pairs of the rack pillars 26 corresponding to the number of expansion units 3 and/or 4 to be additionally provided are additionally provided in the feeding spaces 61 and extend upwardly. In particular, immediately before the expansion units 3 and/or 4 are connected to the basic unit 2, the coupling portions 26*g* of the corresponding rack pillars 26 are coupled to each other by screws not shown as shown in FIG. 9 such that the rack pillars 26 project from the basic unit 2 upwardly. The rack pillars 26 for the expansion units 3 and 4 have a lengthwise dimension substantially equal to the vertical dimension of the housing 5, and the rack pillars 26 for the basic unit 2 have a lengthwise dimension a little shorter than the vertical dimension of the housing 5. From the condition of FIG. 9, the expansion units 3 and 4 are placed one on another on the basic unit 2 and coupled to each other as seen in FIG. 11, and then screws are screwed into the coupling portions 26g from above the lid 7 to couple the uppermost rack pillars 26 to the lid 7 after the lid 7 is coupled to the top plate 5f of the housing 5. Consequently, the lift table 25 of the basic unit 2 can move up to the expansion unit 4 on the top of FIG. 11.

The control circuit section 70 in the basic unit 2 is connected to the control circuit sections in the expansion units 3 and 4 coupled to the basic unit 2 on the rear face portions of the housing 5 by means of a cable ("RS 232C" connection). Since the control circuit sections are connected to each other in this manner, the control circuit section 70 in the basic unit 2 can discriminate the number of the expansion units 3 and/or 4 connected to the basic unit 2 and what kind of expansion unit is coupled in each stage.

In the recording and/or playback apparatus, where one or more expansion units 3 and/or 4 are coupled to the basic unit 2, when the lift table 25 of the transport mechanism 10 is positioned within the basic unit 2, the control circuit section 70 controls the positions and operation of the slide table 33 and the translate table 42 of the transport mechanism 10 based on a position reference point of the basic unit 2. However, when the lift table 25 of the transport mechanism 10 is in an expansion unit 3 or 4, the control circuit section 70 controls the positions and operation of the slide table 33 and the translate table 42 of the transport mechanism 10 based on a position reference point of the expansion unit 3 or 4.

The position reference point of each of the units 2, 3 and 4 is provided on the bottom plate 5a of the unit 2, 3 or 4 and serves as a reference for the positions of the drives 8 and the cassette shelf 9 of the unit 2, 3 or 4. Accordingly, since the control circuit section 70 controls the positions and operation of the slide table 33 and the translate table 42 of the transport mechanism 10 based on the position reference point of each unit 2, 3 or 4, even if the rack pillars 26 coupled to each other have some positional displacement, the slide table 33 and the translate table 42 are controlled to an accurate position with respect to the drives 8 and the cassette shelf 9 in each unit 2, 3 or 4.

The position reference point is provided with regard to the origin of moving operation of the slide table 33 and the translate table 42 of the transport mechanism 10 and the vertical position of each case 12 of the cassette shelf 9 as seen in FIG. 15. The origin of moving operation of the slide table 33 and the translate table 42 can be detected as a position when each of the slide table 33 and the translate table 42 is moved in a predetermined direction until it collides with a member 80 provided on the bottom plate 5a and indicative of the position reference point. Further, the vertical position of each of the cases 12 of the cassette shelf 9 can be detected as a position of a slit 82 of a member 81 provided on the bottom plate 5a and indicative of the position reference point.

When the expansion units 3 and/or 4 are coupled to the basic unit 2, the power supply to the control circuit sections is cut. After the coupling of the units 2, 3 and 4 is completed, the power supply to the control circuit sections is made available, and thereupon, the control circuit section 70 executes an initialization process of detecting and storing the position reference points 80 and 82 of the units 2, 3 and 4 as seen in FIG. 16.

Figure 17:
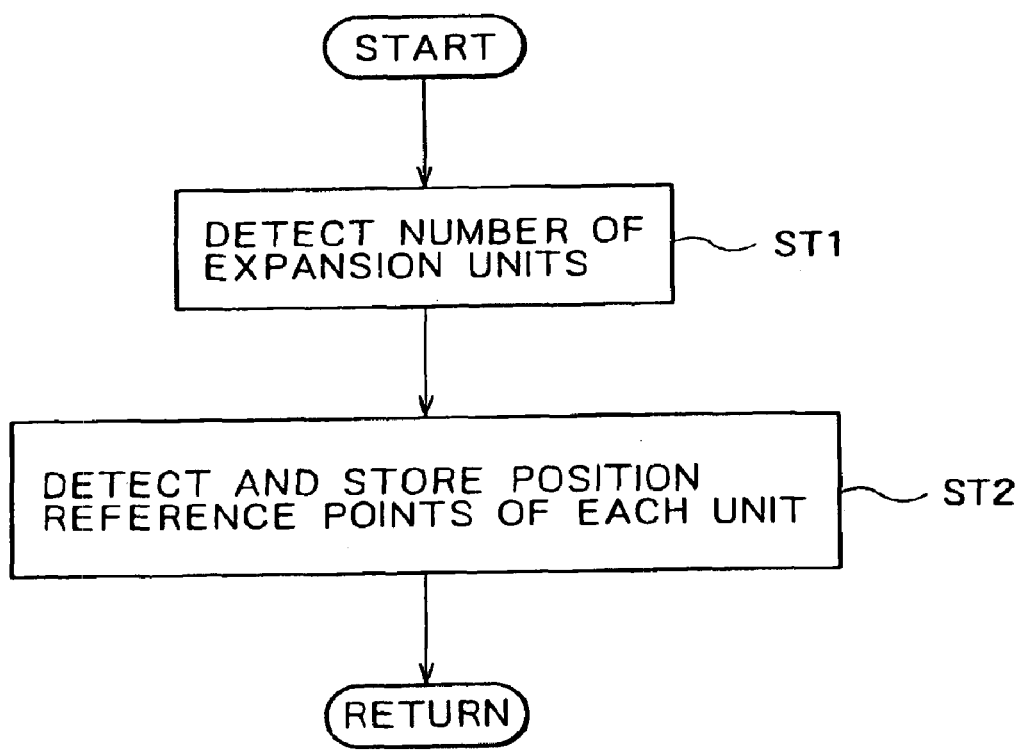
FIG. 17 is a flow chart illustrating an initialization process of the tape library after an expansion unit is incorporated into the tape library.

Referring to FIG. 17, when the initialization process is performed, the control circuit section 70 of the basic unit 2 first communicates, in step st1, with the control circuit sections of the expansion units 3 and 4 coupled to the basic unit 2 to discriminate and store the number of expansion units 3 and 4 coupled to the basic unit 2.

Then in step st2, the control circuit section 70 of the basic unit 2 detects and stores the position reference point of each of the basic unit 2 and the expansion units 3 and 4. The detection of the position reference point of each unit 2, 3 or 4 is performed such that the lift table 25 of the transport mechanism 10 is moved in the unit 2, 3 or 4 and, in each unit 2, 3 or 4, each of the slide table 33 and the translate table 42 is moved until it collides with the member indicative of the position reference point while the position of the slit in the member indicative of the position reference point is detected for each unit 2, 3 or 4.

Once such an initialization process as described above is completed, the control circuit section 70 can thereafter control the positions and operation of the slide table 33 and the translate table 42 of the transport mechanism 10 for each unit 2, 3 or 4 based on the stored position reference point in each of the units 2, 3 and 4.

It is to be noted that, in place of performing such an initialization process as described above when the power supply is made available, it is possible to first detect and store the position reference point of the basic unit 2 and then detect and store, when the lift table 25 of the transport mechanism 10 is moved in any of the expansion units 3 and 4, the position reference point of the expansion unit 3 or 4.

Figure 18:
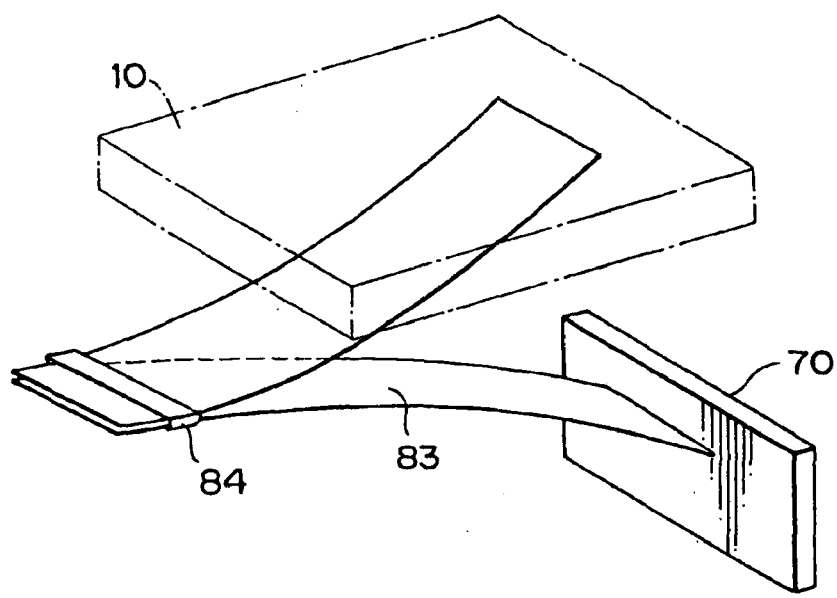
FIG. 18 is a schematic perspective view showing a configuration of a flat cable for connecting the transport mechanism and a control circuit section of the tape library.

The control circuit section 70 and the transport mechanism 10 of the basic unit 2 are connected to each other by a flat cable 83 of an elongated belt-like configuration which includes, as shown in FIG. 18, a plurality of conductors expending in parallel to each other and joined together with an insulating member.

Figure 19:
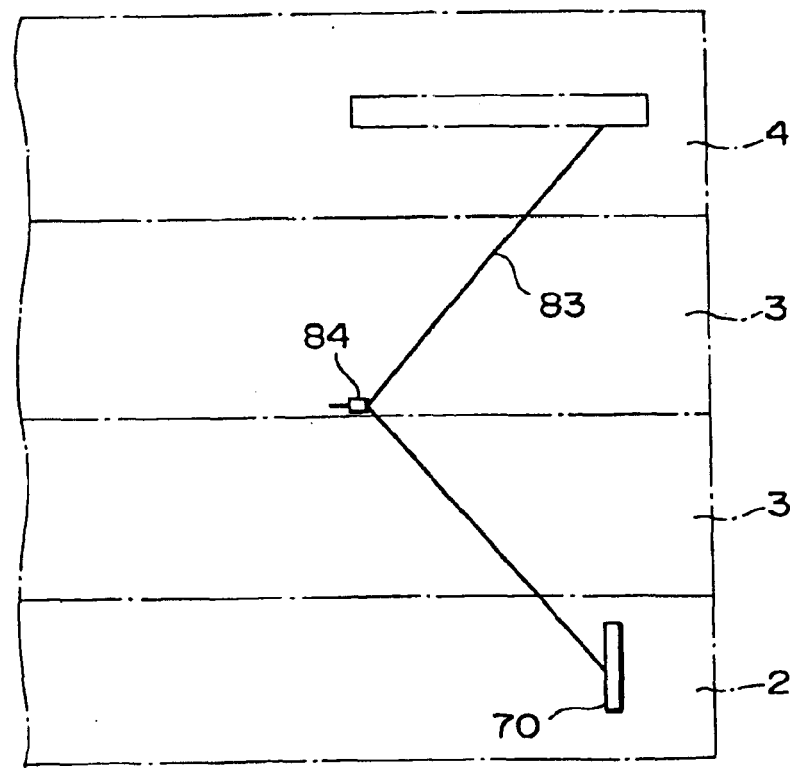
FIG. 19 is a side elevational view showing a configuration of the flat cable shown in FIG. 18.

The flat cable 83 is bent or folded over at a substantially central portion thereof in the longitudinal direction and held at a portion in the proximity of the folded portion thereof by a fold holding member 84. When the lift table 25 of the transport mechanism 10 is moved in an expansion unit 3 or 4, the angle between the opposite end portions of the flat cable 83 with respect to the folded portion varies in accordance with the distance between the control circuit section 70 and the transport mechanism 10 of the basic unit 2 as seen in FIG. 19.

Accordingly, in the present tape library 1, when a number of expansion units up to a predetermined number are to be additionally provided, the flat cable 83 for interconnecting the control circuit section 70 and the transport mechanism 10 of the basic unit 2 need not be exchanged.

Figure 20:
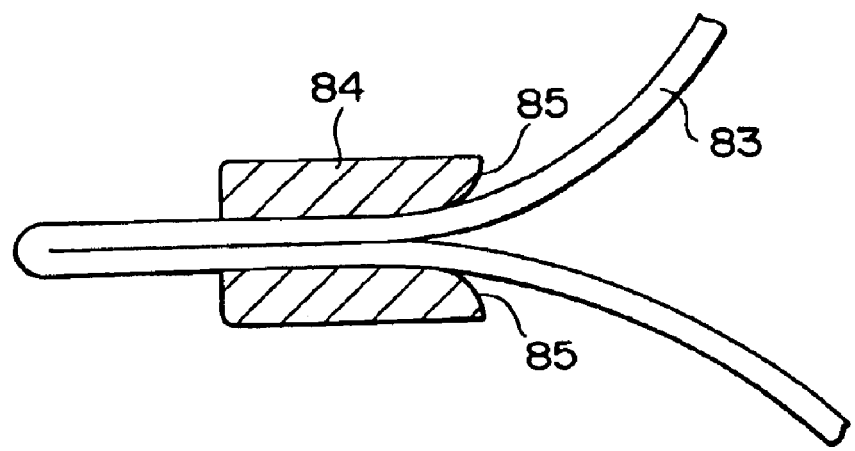
FIG. 20 is a vertical sectional view showing a configuration of an essential part of the flat cable shown in FIG. 18.

The fold holding member 84 is produced by molding of a synthetic resin material, and a portion 85 thereof which is pressed by the flat cable 83 when the opposite ends of the flat cable 83 are opened has a shape of a cylindrical face around an axis parallel to a principal plane of the flat cable 83 and perpendicular to the longitudinal direction of the flat cable 83 as seen in FIG. 20. Also when the angle between the opposite end portions of the flat cable 83 around the folded portion is expanded, since the flat cable 83 contacts with the portion 85 of the cylindrical face shape, it is not acted upon by such a stress as may cause disconnection of the wires.

Figure 21:
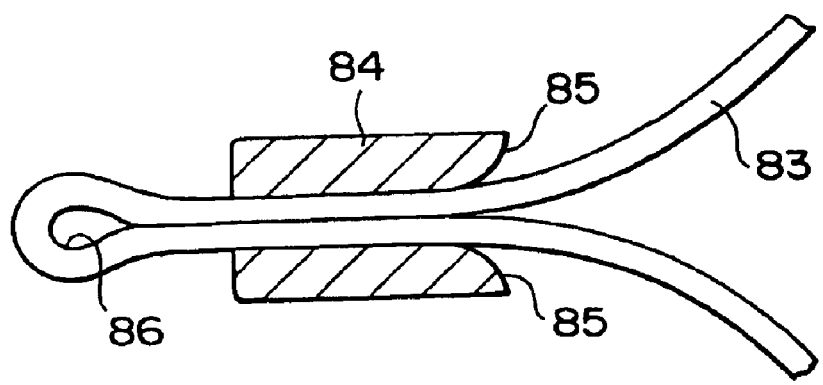
FIG. 21 is a similar view but showing another configuration of an essential part of the flat cable shown in FIG. 18.

It is to be noted that the flat cable 83 may otherwise be curved arcuately at the folded portion thereof as seen in FIG. 21. Further, the fold holding member 84 may be formed from a flexible material.

5. Operation

Now, operation of the tape library 1 is described.

5-a. Accommodation and Takeout of Tape Cassette onto and from Cassette Shelf

To accommodate or take out a cassette tape into or from the cassette shelf 9, an insertion button or a takeout button will be depressed. Thereupon, one of the cases 12 of the cassette shelf 9 of one of the basic unit 2 and the expansion units 3 and 4 is selected. If it is assumed that a certain case 12 shown in FIG. 1 is selected, then the table 11 is rotated until the selected case 12 comes to the position at the outer gate 22 corresponding to the inlet opening 24 shown in FIG. 1. Then, a cassette tape is inserted into or taken out from the case 12 through the inlet opening 24.

The table 11 is rotated in the following manner. When the motor 16 shown in FIG. 4 rotates, the force of rotation is transmitted to the center gear 15 through the gear 17 and rotates the table 11 integral with the center gear 15. Positioning when the table 11 stops after its rotation is performed by the encoder 18 and the position sensor 19.

5-b. Takeout of Cassette Tape from Cassette Shelf

To record or play back a cassette tape, a selection button for a cassette tape and a recording button or a playback button will be depressed. Consequently, the selected cassette tape is transported to one of the drives 8. Each of the basic unit 2 and the expansion units 3 includes two drives 8, and that one of the drives 8 which is positioned nearest to the case 12 of the selected cassette tape is selected If, for example, the cassette tape in the upper stage of the lowermost expansion unit 3 is selected and the drive 8 on the left side as viewed from the front of the expansion unit 3 is selected, then the takeout of the cassette tape is performed in the following manner.

When the cassette tape is selected, the table 11 is rotated to and stops at a position corresponding to the inner gate 23 in FIG. 6. Meanwhile, the lift table 25 of the transport mechanism 10 is moved toward the inner gate 23 simultaneously. More particularly, the lift table 25 moves in the following manner. Referring to FIG. 5, the motor 30 rotates, and the force of rotation of the motor 30 is transmitted to the pair of pinions 68 through the worm gear 31, helical gear 32 and connection shaft 29 so that the pinions 68 are rolled on the racks 26*d*. Then, when a predetermined position is detected by the encoder 65, then the rotation of the motor 30 is stopped and the upward movement of the lift table 25 is stopped. Thereafter, the motor 38 rotates, and the driving gear 39 rolls on the rack 37. Therefore, the slide table 33 is moved along the guide rod 36 and the connection shaft 29.

Then, when a predetermined position is detected by the encoder 41, the rotation of the motor 38 is stopped and the movement of the slide table 33 is stopped. Thereafter, the motor 45 rotates, and the driving gear 46 rolls on the rack 44. Consequently, the translate table 42 is moved forwardly along the pair of guide rods 43 until the pickers 50 and 51 are inserted into the case 12. Then, when the pickers 50 and 51 pass between the pair of passage sensors 64 and a predetermined position is detected by the encoder 48, the rotation of the motor 45 is stopped and the movement of the slide table 33 is stopped. Thereafter, the motor 54 rotates, and the worm wheel 56 is rotated through the worm 55. Thereupon, the pin 57 provided at an eccentric position on the worm wheel 56 moves along a circle, and the other end of the L-shaped lever 58 in one end of which the pin 57 is fitted moves rearwardly. Thereupon, also the biasing force of the spring 60 acts to close the pickers 50 and 51, and the pawls 50*a* and 51*a* advance into the recessed portions on the side faces of the cassette tape in the case 12 so that the cassette tape is clamped by the pickers 50 and 51. While the cassette tape is held clamped in this manner, the pertaining components move reversely to their movements described above. Thus, as the translate table 42 is moved backwardly, the cassette tape is taken out from the cases 12.

5-c. Transportation of Cassette Tape to Drive

In this state, the lift table 25 is moved downwardly by two steps conversely to that in the movement described above to the position shown in FIG. 6, and then, the slide table 33 is moved rightwardly (leftwardly as viewed from the front). Consequently, the slide table 33 is positioned in an opposing relationship to the target drive 8. Thus, the translate table 42 is moved forwardly, whereupon the clamped cassette tape 67 is inserted into the drive 8. Thereafter, the motor 54 rotates in the reverse direction to that described hereinabove, and the pair of pickers 50 and 51 are opened against the biasing force of the spring 60 so that the cassette tape 67 is released from the pickers 50 and 51 and placed into the drive 8. Thereafter, the translate table 42 is moved backwardly thereby ending the transportation of the cassette tape 67 into the drive 8.

5-d. Returning of Cassette Tape from Drive to Cassette Shelf

After recording or playback of the cassette comes to an end, the cassette tape is returned from the drive 8 and accommodated back into the original case 12 of the cassette shelf 9. The pertaining elements in this instance move reversely to the movements of them when the cassette tape is taken out from the case 12 and inserted into the drive 8. Therefore, overlapping description of the movements is omitted herein to avoid redundancy.

It is to be noted that, while the accommodation means of the present embodiment described above includes two or four stages of accommodation sections, it may otherwise include three or five stages or more of accommodation sections. Further, an expansion unit which only includes recording and/or playback means without provision of an accommodation apparatus may be used. Furthermore, the units may otherwise be disposed in a side by side relationship such that an expansion unit may be provided in a horizontal direction. Further, all units need not have an inlet opening, but only the basic unit may have an inlet opening.

While a preferred embodiment of the present invention has been described using specific terms, such description is for illustrative purposes only, and it is to be understood that changes and variations may be made without departing from the spirit or scope of the following claims.

What is claimed is:

1. A basic unit, comprising:

a housing;

recording and playback means provided in said housing for one of recording data to a recording medium and playing data from said recording medium;

accommodation means provided in said housing for accommodating said recording medium;

feeding means provided in said housing for feeding said recording medium between said accommodation means and said recording and playback means;

guide means provided in said housing for guiding a movement of said feeding means, wherein said accommodation means includes a rotatable member mounted for rotation around an axis, and a plurality of accommodation sections disposed on an outer periphery of said rotatable member for accommodating said recording medium;

said housing has an opening in an opposing relationship to at least one of said plurality of accommodation sections for allowing said recording medium to be one of inserted into and taken out from said one of said plurality of accommodation sections;

a control circuit section connected to said accommodation means, said recording and playback means, and said feeding means for controlling said accommodation means, said recording and playback means, and said feeding means;

at least one expansion unit connected to said basic unit, wherein when said feeding means is positioned within said basic unit said control circuit section controls a position and an operation of said feeding means with reference to a position reference point provided in said basic unit, and when said feeding means is within said expansion unit said control circuit section controls said position and said operation of said feeding means with reference to a position reference point provided in said expansion unit; and a flat cable for interconnecting said control circuit section and said feeding means of said basic unit, wherein said flat cable includes a plurality of conductors extending in parallel and joined with an insulating material to form an elongated belt; said flat cable being folded at a substantially central portion in a longitudinal direction of said flat cable; and said flat cable being held at a portion in proximity to said folded portion by a fold-holding member such that an angle of opposite end portions of said flat cable with respect to said folded portion is variable corresponding to a distance between said control circuit section and said feeding means of said basic unit.

2. The basic unit according to claim 1, wherein when a power supply to said basic unit is available after at least one expansion unit is coupled to said basic unit said control circuit section performs an initialization process of detecting and storing said position reference point of said basic unit and said position reference point of said expansion unit.

3. The basic unit according to claim 2, wherein said control circuit section communicates with a control circuit of said at least one expansion unit coupled to said basic unit to determine a number of said expansion units coupled to said basic unit and stores said determined number prior to said detection of said position reference point of said basic unit and said position reference point of said expansion unit in said initialization process.

4. The basic unit according to claim 1, wherein said fold-holding member is formed by molding a synthetic resin material, and a portion of said fold-holding member pressed by said flat cable when said opposite end portions of said flat cable are opened has a cylindrical shape around an axis parallel to a principal plane of said flat cable and perpendicular to the longitudinal direction of said flat cable.

5. The basic unit according to claim 1, wherein said fold-holding member is formed from a flexible material.

* * * * *